US006694439B2

(12) United States Patent
Cho et al.

(10) Patent No.: US 6,694,439 B2
(45) Date of Patent: Feb. 17, 2004

(54) APPARATUS FOR PROVIDING COMMUNICATIONS DATA OVER A POWER BUS HAVING A TOTAL CURRENT THAT IS THE ABSOLUTE VALUE OF THE MOST NEGATIVE CURRENT EXCURSION DURING COMMUNICATION

(75) Inventors: Jeffrey C. Cho, Northborough, MA (US); John F. Zettler, Stow, MA (US)

(73) Assignee: Adaptive Instruments Corporation, Hudson, MA (US)

( * ) Notice: Subject to any disclaimer, the term of this patent is extended or adjusted under 35 U.S.C. 154(b) by 588 days.

(21) Appl. No.: 09/737,509

(22) Filed: Dec. 15, 2000

(65) Prior Publication Data

US 2003/0079070 A1 Apr. 24, 2003

Related U.S. Application Data

(60) Provisional application No. 60/210,070, filed on Jun. 7, 2000.

(51) Int. Cl.$^{7}$ .......................... G06F 1/26; H04M 11/00

(52) U.S. Cl. ....................... 713/300; 713/310; 713/320; 713/323; 340/310.1; 340/310.6; 340/506

(58) Field of Search ................................ 713/300, 310, 713/320, 323; 340/310.01, 310.06, 506

(56) References Cited

U.S. PATENT DOCUMENTS 5,019,805 A * 5/1991 Curl et al. .................. 340/628
5,886,619 A * 3/1999 Takasan et al. ........ 340/310.06
6,378,959 B2 * 4/2002 Lesesky et al. ............. 340/438
6,426,697 B1 * 7/2002 Capowski et al. .......... 340/506

FOREIGN PATENT DOCUMENTS

EP 146045 A2 * 6/1985 ............ H04B/3/54

OTHER PUBLICATIONS

Dostert, K.M. , "A signal processing ASIC for an all digital spread spectrum modern for power line communications", Spread Spectrum Techniques and Appls, 1994. IEEE ISSSTA '94., IEEE Third Intl. Symp. on, Jul. 4–6, 1994 pp.: 357–361 vol. 2.*

* cited by examiner

*Primary Examiner*—Thomas Lee
*Assistant Examiner*—James K Trujillo
(74) *Attorney, Agent, or Firm*—Iandiorio & Teska

(57) ABSTRACT

A bus powered device includes a signal processing control circuit connected to and powered by a bus at a predetermined operating current and a bus current modulator circuit interconnected in series with a signal processing control circuit to the bus for providing a bipolar communication signal having an average current of substantially zero; the total series current of both the circuits is only the current required by the signal processing control circuit or the absolute value of the most negative current excursion during communication, whichever is greater.

10 Claims, 4 Drawing Sheets

APPARATUS FOR PROVIDING COMMUNICATIONS DATA OVER A POWER BUS HAVING A TOTAL CURRENT THAT IS THE ABSOLUTE VALUE OF THE MOST NEGATIVE CURRENT EXCURSION DURING COMMUNICATION

RELATED APPLICATIONS

This application claims benefit of U.S. Provisional Patent Application Serial No. 60/210,070, filed Jun. 7, 2000 and titled FIELD-BUS MODULATION SCHEME TO MINIMIZE THE LOOP CURRENT.

FIELD OF INVENTION

Be it known that we, Jeffrey C. Cho, residing at 3 Caflin Farm Lane, Northborough, Mass. 01532 and being a citizen of the United States; and John F. Zettler, residing at 62 Barton Road, Stow, Mass. 01775 and being a citizen of the United States, have invented a certain new and useful BUS-POWERED DEVICE THAT INCLUDES A BUS CURRENT MODULATOR CIRCUIT INTERCONNECTED IN SERIES WITH A SIGNAL PROCESSING CONTROL CIRCUIT of which the following is a specification:

This invention relates to an improved bus-powered device and more particularly to such a device which requires less power.

BACKGROUND OF INVENTION

In conventional bus-powered systems such as Field Bus systems a number of devices powered by the bus are serviced by a host computer. Each device may have associated with it one or more devices that transform one form of energy into another e.g. sensors for temperature, pressure, strain or acoustic transmitters or receivers or one or more actuators for valves and the like. These devices typically have two parts: the signal processing and control circuit which interfaces with the sensors or actuators and transforms their output into a digital signal for transmission to the host computer over the bus and a bus current modulator circuit which transmits those digital signals and broadcasts them on to the bus to the host computer.

In a typical case, the two circuits are connected in parallel to the bus. The signal processing control circuit requires a steady predetermined operating current while the bus current modulator circuit requires current only when communicating. But since the communication is usually a bipolar signal, such as a Manchester code, the bus current modulator circuit must be supplied at all times with at least half the current it needs only when communicating. Thus, half that current is wasted. Yet it must be available and be considered when calculating the number of devices that can be loaded on a given bus. For example, for a case in which the steady operating current for the signal processing control circuit is 16 ma and the bipolar signal used by the bus current modulator circuit swings 10 ma in each direction, the total current required is at least 10 ma plus 16 ma or a minimum of 26 ma.

SUMMARY OF THE INVENTION

It is therefore an object of this invention to provide an improved bus-powered device which uses less current.

It is a further object of this invention to provide such an improved bus-powered device which permits a greater number of devices to be served by a bus under a given power constraint.

It is a further object of this invention to provide such an improved bus-powered device in which the operating current for the signal processing control circuit is the total current of the entire device including the signal processing control circuit and the bus current modulator circuit.

It is a further object of this invention to provide such an improved bus-powered device which reduces the size of the power supply required to operate the bus.

It is a further object of this invention to provide such an improved bus-powered device which may reduce power requirements by up to 50%.

It is a further object of this invention to provide such an improved bus-powered device which even in hazardous areas with current limited by intrinsic safety barriers can increase the number of device serviceable by the bus.

The invention results from the realization that a more efficient lower power bus-powered device can be achieved by placing the signal processing control circuit and bus current modulator in series with the bus so that with the bipolar communication signal having an average current of essentially zero superimposed on the operating current of the signal processing control circuits the total current of both circuits is merely the operating current of the signal processing control circuit.

This invention features a bus-powered device including a signal processing control circuit connected to and powered by a bus at a predetermined operating current. A bus current modulator circuit is interconnected in series with the signal processing control circuit to the bus providing a bipolar communication signal. The total operating current is the greater of the current required by the signal processing control circuit or the largest absolute negative current excursion during communication.

In a preferred embodiment, the signal processing control circuit may include a power supply powered from the bus. The signal processing control circuit may include a digital signal processing circuit. The signal processing control circuit may include an analog signal conditioning and control circuit. The signal processing control circuit may include at least one sensor and/or it may include at least one actuator. The digital signal processing circuit may include a microprocessor. The bipolar communication signal may be a Manchester code. The signal processing control circuit may include a reservoir capacitor for maintaining the predetermined operating current during the low part of the bipolar communication signal. The signal processing control circuit may include a voltage regulating device controlling the voltage on the reservoir capacitor. The bipolar communication signal may have an average current of substantially zero.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
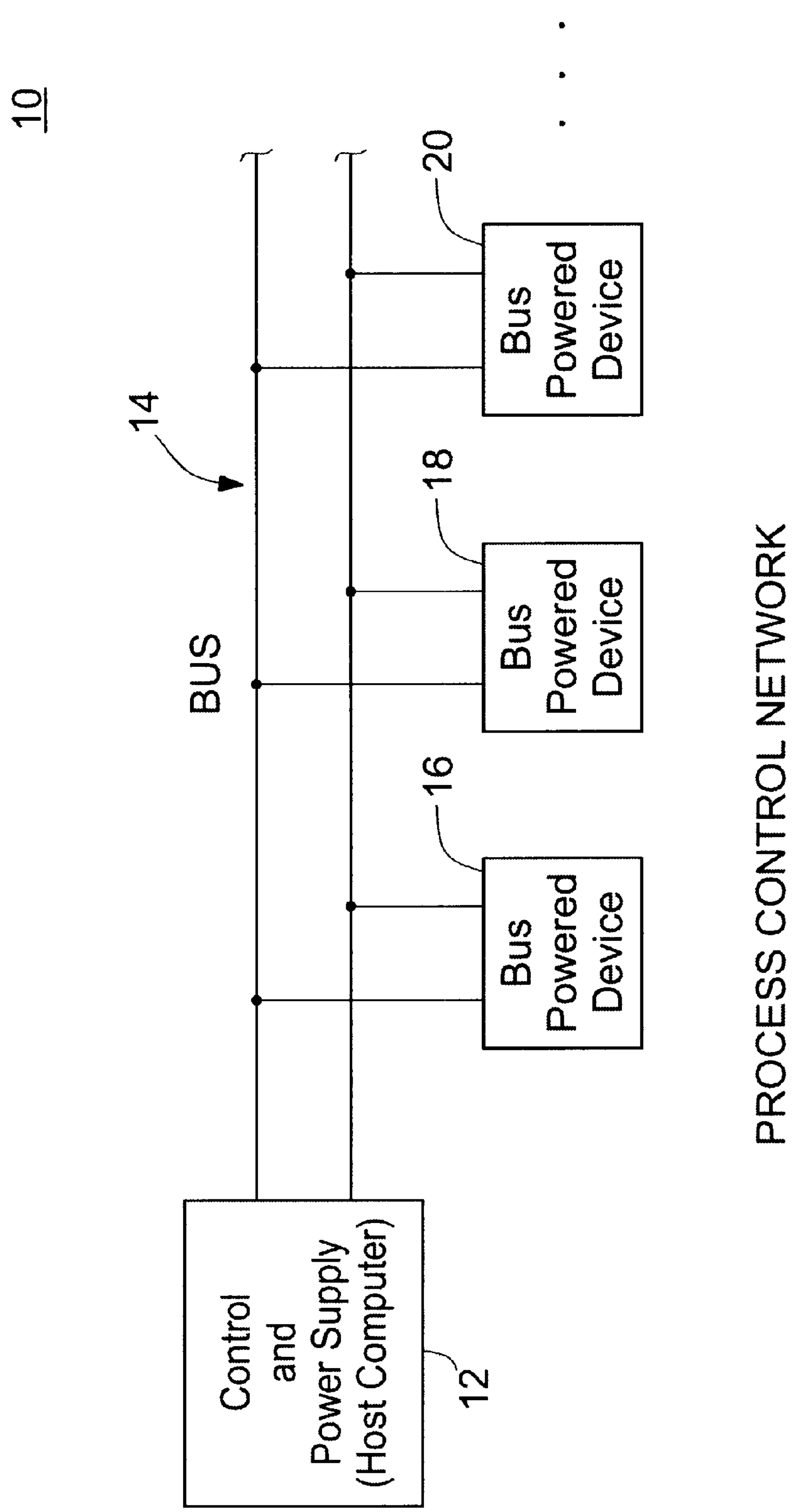
FIG. 1 is a schematic diagram of a typical field bus system employing the bus-powered device of this invention.

There is shown in FIG. 1 a bus-powered process control network 10 including a host computer 12 which functions as a controlled power supply for the bus 14. Connected to the bus are a number of bus powered devices 16, 18 and 20. Each of these devices is powered by the bus and may include in its own unit one or more sensors or actuators which it services.

Figure 2:
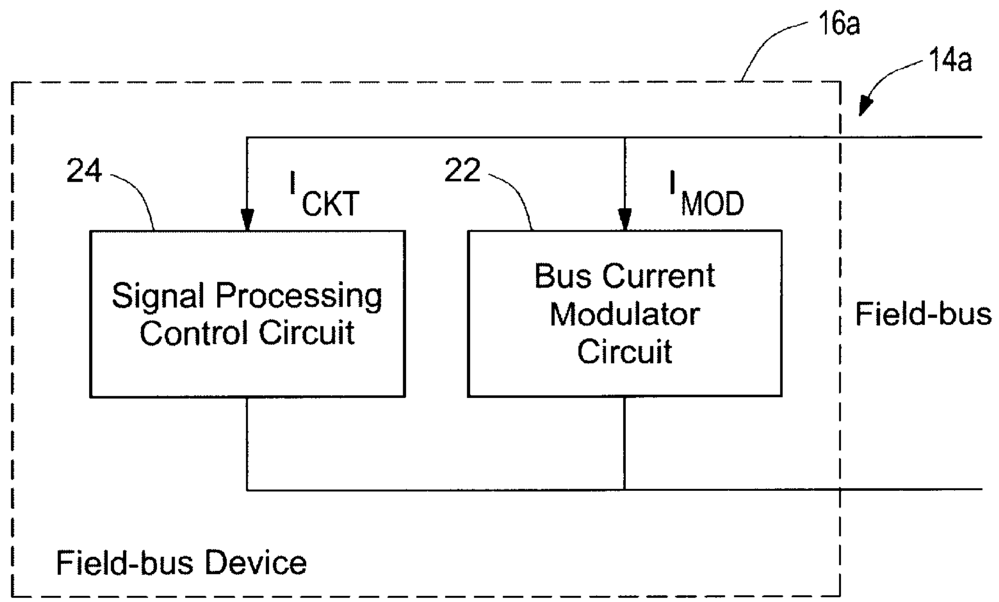
FIG. 2 is a schematic block diagram of a conventional prior art bus-powered device.

A typical bus powered prior art device 16*a* is shown in FIG. 2 as including a bus modulator circuit 22 and signal processing control circuit 24 connected in parallel across bus 14*a* in the form of a typical field bus device. Signal processing control circuit 24 requires the steady current $I_{CKT}$ for its operation which includes the servicing of all of its transducer elements be they sensors for temperature, pressure and the like or actuators for operating valves and similar elements. This current may be in a range of 16 ma. In parallel with it is bus current modulator circuit 22 which takes the digitized signal provided by signal processing control circuit 24 derived from its transducers and communicates it over bus 14*a* to the host computer 12. Bus current modulator circuit 22 typically uses a bipolar or balanced communication signal such as a Manchester code. Thus when it is communicating over bus 14*a*, bus current modulator circuit requires current $I_{MOD}$.

Figure 3:
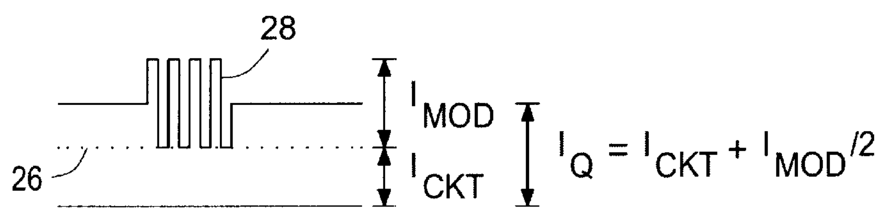
FIG. 3 is an illustration of the current requirements for the prior art bus-powered device of FIG. 2.

Further, since it operates with a balanced or bipolar signal, bus current modulator circuit 22 must have at least half of that signal, $I_{MOD/2}$, present at all times even when it is not communicating. This is so because it needs to operate so that its excursions in the negative direction don't go below zero. This fundamental idea is depicted in FIG. 3 where the operating current $I_{CKT}$ for signal processing control circuit 24 is, as represented at 26, present all the time and superimposed on it part of the time is bipolar signal 28 constituting $I_{MOD}$. Since bipolar current 28 must go up and down equally, there has to be present at all times a total current $I_Q$ equal to $I_{CKT}$ plus at least half of $I_{MOD/2}$. This means that half of the $I_{MOD/2}$ current is wasted except during those brief periods when there is communication. For example, $I_{MOD}$ can be as much as 20 ma, $I_{MOD/2}$ is thus 10 ma and so the total current required would be $I_{CKT}$, for example 16 ma, plus $I_{MOD/2}$ or 10 ma for a total $I_Q$ of 26 ma: there is an extra 10 ma flowing all the time even though it is only needed during a communication.

Figure 4:
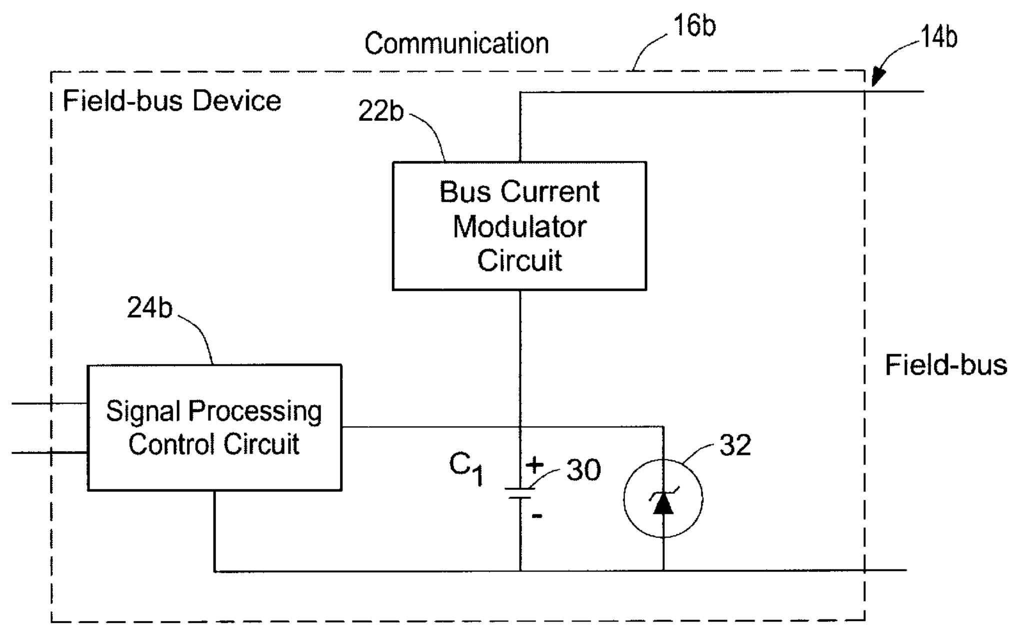
FIG. 4 is a schematic block diagram of a bus-powered device according to this invention.
Figure 5:
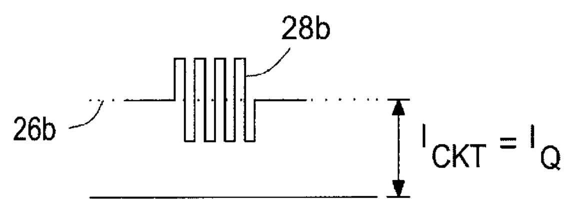
FIG. 5 is an illustration of the reduced current requirements for the bus-powered device of FIG. 4 according to this invention.

In accordance with the present invention, bus current modulator circuit 22*b*, FIG. 4 and signal processing control circuit 24*b* are placed in series across bus 14*b*. In this way, the entire device can be made to draw the greater of $I_{MOD/2}$ or $I_{CKT}$. This can be seen from the fact that with the two circuits in series, the current $I_{CKT}$ shown at 26*b*, FIG. 5, runs through both circuits, the bus current modulator circuit 22*b* and the signal processing control circuit 24*b*. And the bipolar signal current 28*b* which has an average current of zero is superimposed on the current $I_{CKT}$, therefore the total current $I_Q$ is simply equal to $I_{CKT}$. Thus, when the device is not communicating, the modulator circuit 16*b* adds no current to the total current required. During the logic low part of the transmission of communication signal 28*b*, the modulator actually swings below the current level required to run the rest of the electronics, but this period is relatively short and so the voltage on reservoir capacitor 30, FIG. 4, only sags a very small amount. For example, if the current deficit during the low part is 10 ma and the capacitor is 33 $\mu$F, then the droop in the capacitor voltage is only $\Delta V=(I/C)/\Delta t=10$ ma/33 $\mu$F/17 $\mu$S=5 mV. The small dip in the capacitor voltage is made up during the high part of the transmission 28*b* since the transmission data has a 50% duty cycle, for example, as a Manchester code, the transmission process neither charges nor discharges the reservoir capacitor in the long term.

The present invention has been described with respect to signaling schemes which have an average current of substantially zero (such as Manchester code). Although the greatest advantage is derived when using such signaling schemes, there are still advantages if the average signaling current is greater than zero.

Figure 6:
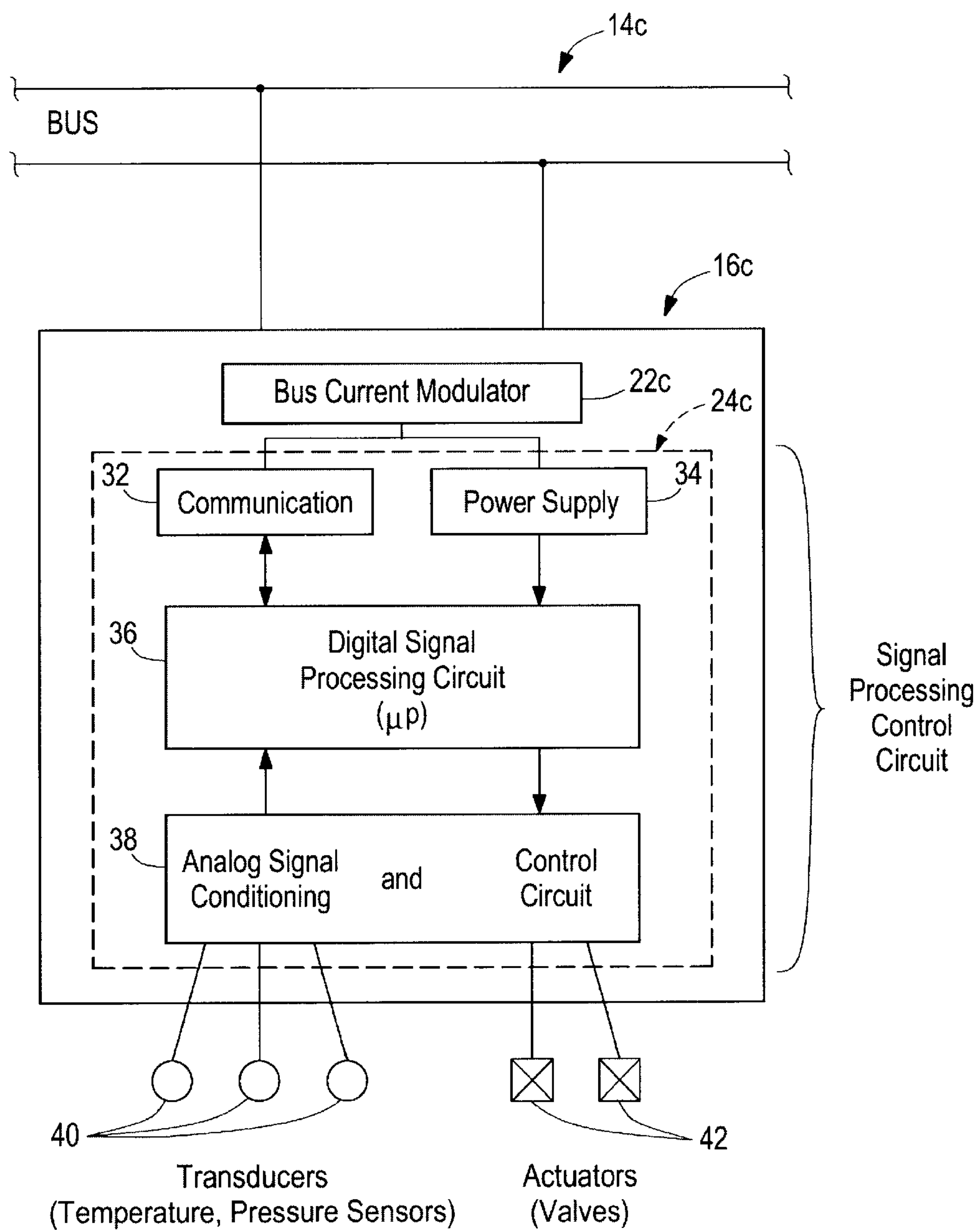
FIG. 6 is a more detailed view of the bus-powered device of FIG. 4.

In actual practice, the idle transmission current has to be set slightly higher than the required circuit current to guarantee that there is always some long term surplus current. Zener diode 32 is placed across capacitor 30 to establish the internal voltage level for the processing circuit. A typical bus power device, according to this invention, 16*c*, FIG. 6 includes bus current modulator 22*c* and signal processing control circuit 24*c* includes, for example, communication circuit 32, power supply 34, digital signal processing circuit 36, which may for example be a microprocessor, an analog signal conditioning and control circuit 38 and one or more sensors (e.g. temperature, pressure, strain) 40 and/or one or more actuators 42 for operating valves or other equipment.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A bus-powered device comprising:

a signal processing control circuit connected to and powered by a bus at a predetermined operating current; and a bus current modulator circuit interconnected in series with said signal processing control circuit to the bus for providing a bipolar communication signal; the total series current of both said circuits being only said predetermined operating current of said signal processing control circuit or the absolute value of the most negative current excursion during communication, whichever is greater.

2. The bus-powered device of claim 1 in which said signal processing control circuit includes a power supply powered from the bus.

3. The bus-powered device of claim 1 in which said signal processing control circuit includes a digital signal processing circuit.

4. The bus-powered device of claim 1 in which said signal processing control circuit includes an analog signal conditioning and control circuit.

5. The bus-powered device of claim 1 in which said signal processing control circuit includes at least one sensor.

6. The bus-powered device of claim 1 in which said signal processing control circuit includes at least one actuator.

7. The bus-powered device of claim 3 in which said digital signal processing circuit includes a microprocessor.

8. The bus-powered device of claim 1 in which said signal processing control circuit includes a reservoir capacitor for maintaining said predetermined operating current during the low part of said bipolar communication signal.

9. The bus-powered device of claim 8 in which said signal processing control circuit includes a voltage regulating device for controlling the voltage on said reservoir capacitor during the high part of said bipolar communication signal.

10. The bus-powered device of claim 1 in which said bipolar communication signal has an average current of substantially zero.

* * * * *